Sept. 16, 1952    R. H. NORRIS    2,610,576
ROTATABLE MARKING TOOL

Filed Oct. 27, 1949    2 SHEETS—SHEET 1

INVENTOR.
Richard H. Norris
BY
Harness, Dickey & Pierce.
ATTORNEYS.

INVENTOR.
Richard H. Norris
BY
Harness, Dickey & Pierce
ATTORNEYS.

Patented Sept. 16, 1952

2,610,576

UNITED STATES PATENT OFFICE 2,610,576

ROTATABLE MARKING TOOL

Richard H. Norris, Detroit, Mich., assignor to New Method Steel Stamps, Inc., Detroit, Mich., a corporation of Michigan Application October 27, 1949, Serial No. 123,854

3 Claims. (Cl. 101—7)

This invention relates to new and useful improvements in tools for marking graduations or other indicia on external surfaces of screw machine parts or the like.

Many workpieces must be stamped or marked after they are formed. Usually, the parts are made on one machine and are then, as a separate operation, remounted on another machine for marking. In the case of screw machine parts which may be turned out at a rate of several thousand per hour per machine, this operation greatly increases the production cost of the parts. When marking in this manner, the tool is advanced to press the marking die against the work, the work is then rotated to roll the marking die across the surface of the work, and the tool is then retracted.

A preferred procedure is to mark the work while it is being rotatably driven at a high rate of speed during or immediately following the actual forming operation. This does away with the second operation and substantially reduces the total cost of the workpieces. However, to my knowledge, there is no marking tool available at the present time that will perform this operation without scoring or otherwise damaging the part. The usual procedure is to jam the marking die against the work and then retract it as rapidly as possible. This procedure produces a satisfactory marking but no way has yet been found of retracting the marking tool quickly enough so that the marking side does not score the work. These score marks mar the work and may be highly objectionable in many instances, as, for example, parts adapted for cameras and the like where appearance is an important factor and has a profound effect on the sales appeal of the finished product. In addition to the above, dragging of the marking die across the face of the work during retraction of the marking tool wears the die and results in a shortened life for the die.

An important object of the present invention is to provide a marking tool that can be mounted on a screw machine or other machine tool and operated so as to jam the marking roll against the work while the latter is being rotated at a high rate of speed.

Another object of the invention is to provide a marking tool that is uniquely constructed so as not to score or otherwise deface the marked surface of the work.

Still another object of the invention is to provide a marking tool that is uniquely constructed so that the marking die does not drag across the work after the marking operation is completed regardless of whether or not the tool is retracted immediately from the work.

Other objects and advantages of the invention will be apparent during the course of the following description.

In the drawings forming a part of this specification and wherein like numerals are employed to designate like parts throughout the same, Figure 1 is a perspective view showing a marking tool embodying the present invention mounted, by way of example, on a conventional lathe;

Figure 1:
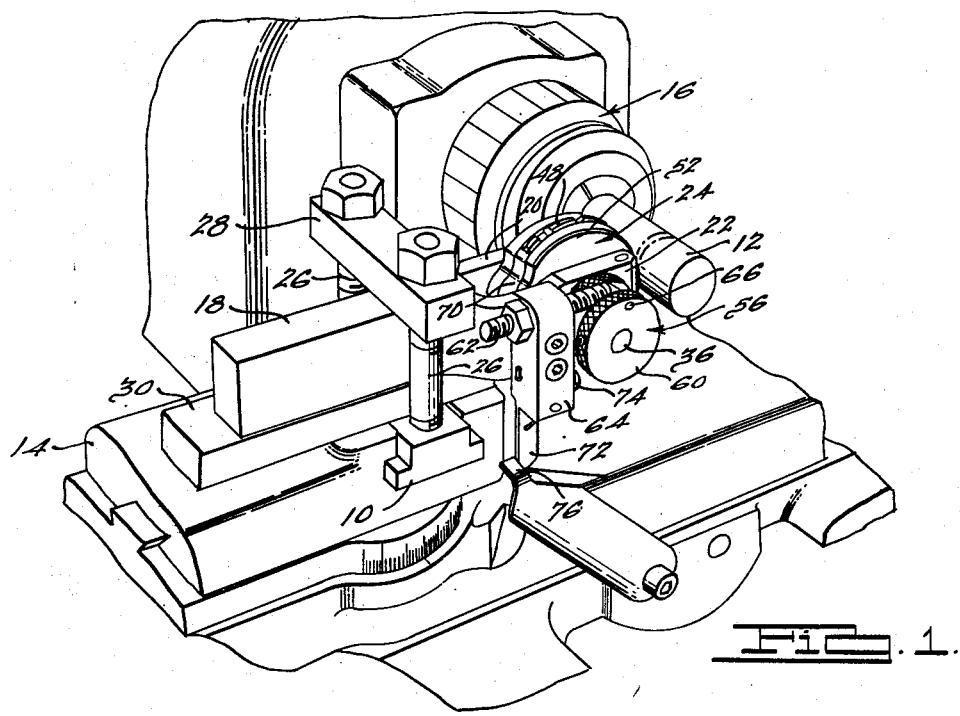
Figure 2:
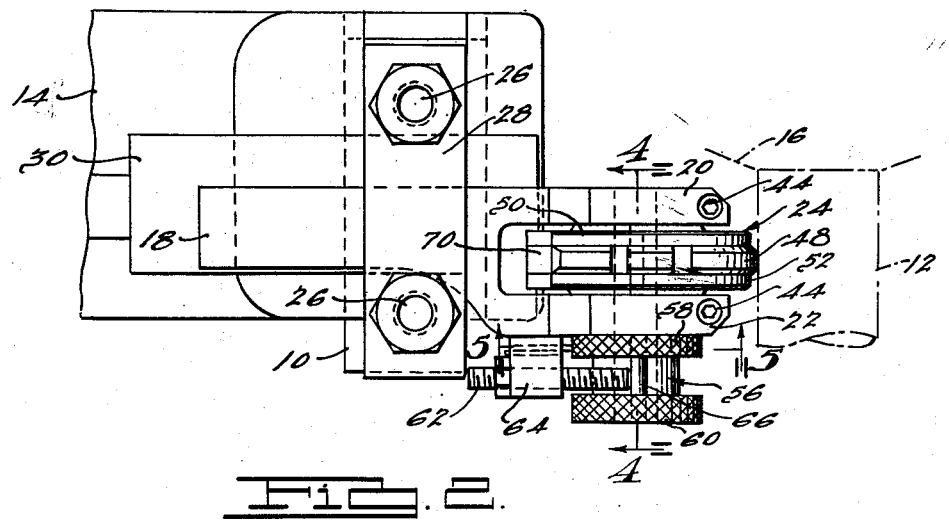
Fig. 2 is a top plan view thereof.

In the drawing, the tool is shown mounted on a conventional lathe; however, it is to be understood that the device can be used on mills, screw machines or any type of machine where work is rotated. In the particular machine here shown by way of illustration, the tool is mounted on a slide 10 which moves parallel to the work 12 and the slide 10 is carried by a second slide 14 which moves at right angles to the work. The two slides 10 and 14 are disposed below the work 12 and the latter is rotatably driven by a head stock 16 according to conventional practice. The slide 10 is actuated to adjust the marking tool longitudinally along the work 12 and the slide 14 is actuated to move the marking die to and from the work during the marking operation. The slides 10 and 14, of course, may be actuated either mechanically or hydraulically depending on the particular type of machine on which the marking tool is mounted.

The marking tool comprises a mounting bracket 18 having bifurcations 20 and 22 at one end thereof disposed in embracing relation to and rotatably supporting a marking roll 24. In the particular machine shown in Fig. 1, the mounting bracket 18 is clamped solidly on the slide 10 by studs 26 and crossbar 28. A spacer 30 is interposed between the slide 10 and the mounting bracket 18 to hold the marking roll 24 positioned vertically for proper engagement with the work 12.

Figures 4, 5:
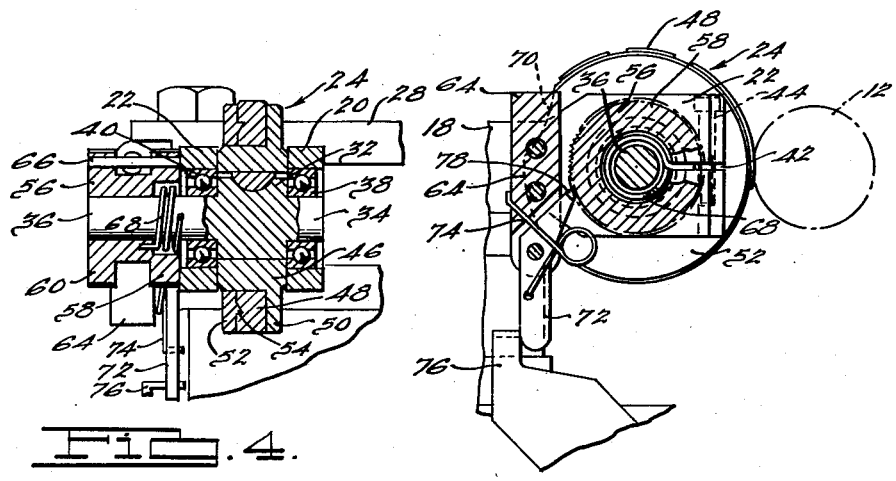
Fig. 4 is a fragmentary, transverse sectional view taken on the line 4—4 of Fig. 2; and, Fig. 5 is a fragmentary, longitudinal sectional view taken on the line 5—5 of Fig. 2.

The marking roll 24, here shown by way of illustration, comprises a generally disc shaped hub portion 32 having oppositely disposed axial spindles 34 and 36 which extend through respective difurcations 20 and 22 and are supported for rotation therein by bearings 38 and 40 (Fig. 4). For ease in assembling and in order to tightly clamp the bearings 38 and 40, bifurcations 20 and 22 are split as at 42 (Fig. 5) and the split ends are pulled into clamping engagement with the bearings by screws 44. Surrounding the hub portion 32 and keyed thereto for mutual rotation therewith is an annular rim member 46 which carries the marking die 48. In this connection it will be observed that the rim 46 is formed adjacent one side thereof with a radially projecting flange 50 and that the marking die 48 is pressed laterally against the flange 50 by an annulus 52 press-fitted on the rim member. Projections 54 on the annulus 52 enter corresponding recesses in the die 48 to prevent the latter from shifting circumferentially or rotatably on the rim member 46.

Spindle 36 is longer than spindle 34 and extends a substantial distance beyond the bearing 40. Mounted on the projecting portion of spindle 36 is a knob 56 having a pair of laterally spaced, radially projecting, annular flanges 58 and 60. The knob 56 is fixed to the spindle 36 so as to rotate with the marking die. An adjustable stop screw 62 carried by a block 64 fastened on the outer side of bifurcation 22 engages a pin 66 carried by and extending between the flanges 58 and 60 to position marking die 48 rotatably for proper initial engagement with the work 12. A helical spring 68 having one end attached to the knob 56 and the other end anchored in the split end of bifurcation 22 holds the pin 66 normally against the stop 62.

When the marking roll 24 is jammed against the rotatably driven work 12, friction causes the roll to rotate; and, as the roll rotates, the marking die 48 stamps the desired legend on the work. Also, as the marking roll 24 rotates, spring 68 is tightened preparatory to returning the roll to its initial position when the work 12 is released.

According to the present invention the marking roll 24 is formed with a peripheral indentation or recess 70 which extends the full width of the roll (Fig. 1) substantially immediately behind the marking indicia and a pivoted pawl 72 is mounted on the block 64 to engage the outer peripheral surface of the inner flange 58. A spring 74 anchored at one end to the block 64 and at the other end thereof to pawl 72 holds the latter normally engaged with the flange 58. By reason of the recess 70 and pawl 72 the marking roll 24 can be jammed against the rapidly rotating work to mark the same without scoring the work and without dragging the marking indicia across the work as the recess moves into confronting relation with the work to disengage the roll therefrom and the pawl holds the roll thus positioned until it has been retracted from the work.

Figure 3:
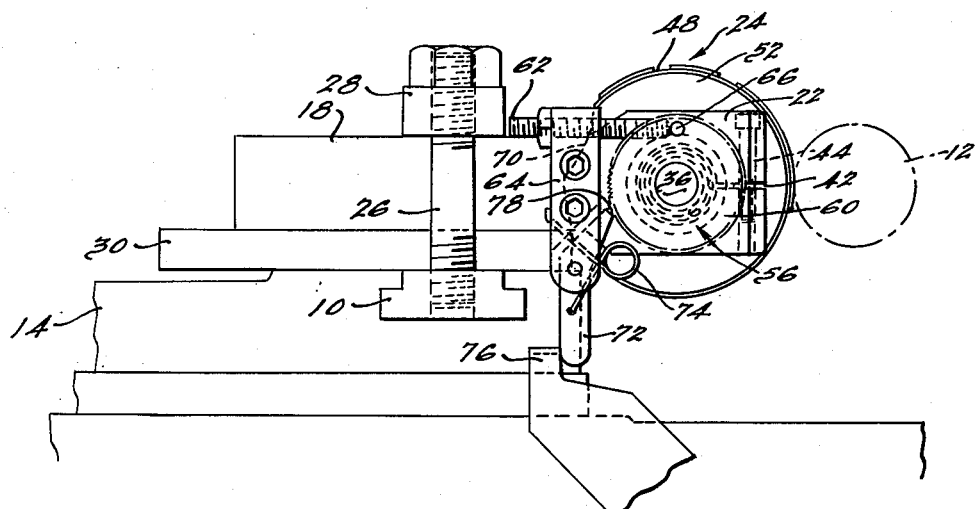
Fig. 3 is a side elevational view of the same.

In operation, slide 14 is advanced to jam the marking roll 24 against the work 12 while the latter is being rotatably driven. The roll 24 approaches the work 12 substantially as shown in Fig. 3. The indicia is embossed on the marking die 48 and the latter engages the work immediately in advance of the indicia. In actual practice the indicia may be printing, calibration markings or any legend that is to be formed on or pressed into the surface of the work. In any event, friction between the marking roll 24 and the rapidly rotated work 12 causes the work to drive the roll. Manifestly, the roll 24 thereafter travels at the same surface speed as the work 12 as long as the roll is engaged with the work. As the roll 24 rotates to a position where the marking indicia disengages the work 12, pressure of the roll against the work ceases. However, inertia causes the marking roll 24 to continue to rotate after the marking operation until the recess 70 moves into confronting relation with the work 12. Manifestly, in the latter position of marking roll 24 there is no engagement between the roll and the work. Pawl 72 drags across the periphery of flange 58 during rotation of the roll 24 to prevent the latter from spinning past the recess 70 and again engaging the work. Also, the pawl 72 checks reverse rotation of the marking roll 24 and holds the roll against the action of spring 68 with the recess 70 facing the work 12. The marking tool can then be retracted without scoring or otherwise damaging either the work or the marking die.

In order to release the marking roll 24 so that spring 68 can return it to its initial position preparatory to a subsequent marking operation, a stop 76 is positioned to engage pawl 72 as the tool is retracted. As perhaps best shown in Fig. 5, the stop 76 rocks pawl 72 against the action of spring 74 to disengage flange 58. As soon as the flange 58 is released, spring 68 returns the marking roll 24 to its initial position. In this connection it will be readily apparent that spring 68 rotates marking roll 24 until the pin 66 engages the stop 62.

A special feature of the invention comprises the provision of a beveled edge 78 on the end of the pawl 72 which bears against the flange 58. Preferably, the bevel angle of edge 78 corresponds to the knurling angle of the flange 58. A 45° angle in both instances has been found satisfactory. As a result, any tendency for the marking roll 24 to rotate to its initial position while engaged by pawl 72 cams the engaged end of the pawl laterally against the bracket 18, and binding engagement between the pawl and the bracket merely increases the resistance offered by the pawl to retraction of the roll.

It may thus be seen that I have accomplished the objects of my invention. I have provided a marking tool wherein the roll can be pressed against the work to mark the same and which will not score the work or damage the marking die. The tool embodying the present invention is no more expensive or difficult to make than conventional devices of this character and at the same time it is considerably more efficient in operation. The tool can be mounted on any type of machine or adapted to any type of machine which supports and rotatably drives a workpiece to be marked.

Having thus described the invention, I claim:

1. A marking tool comprising a mounting bracket, a rotatable marking roll carried by said mounting bracket adapted for movement to and from a rotatably driven object to be marked and to be rotated by engagement with said object, said roll including a peripheral marking die having embossed indicia thereon and engageable with said object to mark the same during rotation of the roll, a recess in the periphery of said roll immediately behind said marking indicia for disengaging the roll from said object after the marking operation is completed, a knob rotatable with the marking roll having a serrated peripheral surface, and a spring loaded pivoted pawl disposed beside the mounting bracket and arranged with one end thereof in engagement with the serrated periphery of said knob, said pawl being positioned to ratch freely over the surface of the knob during the marking operation and engageable with the serrations on said knob to check reverse rotation of the roll after the marking operation is completed.

2. A marking tool comprising a mounting bracket, a rotatable marking roll carried by said mounting bracket adapted for movement to and from a rotatably driven object to be marked and to be rotated by engagement with said object, said roll including a peripheral marking die having embossed indicia thereon and engageable with said object to mark the same during rotation of the roll, a recess in the periphery of said roll immediately behind said marking indicia for disengaging the roll from said object after the marking operation is completed, a knob rotatable with the marking roll having a serrated peripheral surface, and a spring loaded pivoted pawl disposed beside the mounting bracket and arranged with one end thereof in engagement with the serrated periphery of said knob, said pawl permitting the roll and said knob to rotate freely during the marking operation and coactive with the serrations on said knob to check reverse rotation of the roll after the marking operation is completed, the knob engaging end of said pawl having a beveled surface complementary to and engageable with the knurling on said knob, the knurling and said beveled surface cooperating to cam the pawl laterally against the mounting bracket so that binding engagement between the pawl and the mounting bracket increases resistance offered by the pawl to reverse rotation of said roll.

3. A marking roll comprising a mounting bracket, a slide carrying said mounting bracket and operative to move the latter relative to an object to be marked, a rotatable marking roll carried by said mounting bracket adapted for movement to and from a rotatably driven object to be marked and to be rotated by engagement with said object, said roll including a peripheral marking die having embossed marking indicia thereon, stop means for initially positioning said roll for proper engagement of the marking die with the work, spring means coactive with the roll to hold the same normally against said stop means, a recess in and extending the full width of the periphery of said marking roll substantially immediately behind the marking indicia for disengaging the roll from said object after the marking operation is completed, means including a pivoted pawl for checking reverse rotation of the marking roll after the marking operation is completed, and stop means positioned to engage said pawl when the marking roll is retracted from said object and operative to release the pawl to permit said spring to return the roll to its initial position.

RICHARD H. NORRIS.

REFERENCES CITED

The following references are of record in the file of this patent:

UNITED STATES PATENTS

| Number | Name | Date |
| --- | --- | --- |
| 253,950 | Smith | Feb. 21, 1882 |
| 1,886,564 | Lunden | Nov. 8, 1932 |
| 1,978,330 | Scholtes | Oct. 23, 1934 |
| 2,417,865 | Douglass | Mar. 25, 1947 |